June 29, 1948. G. DE VRIES 2,444,388
DEVICE FOR INDICATING DIRECTION AND DISTANCE
Filed Dec. 29, 1938 3 Sheets-Sheet 2
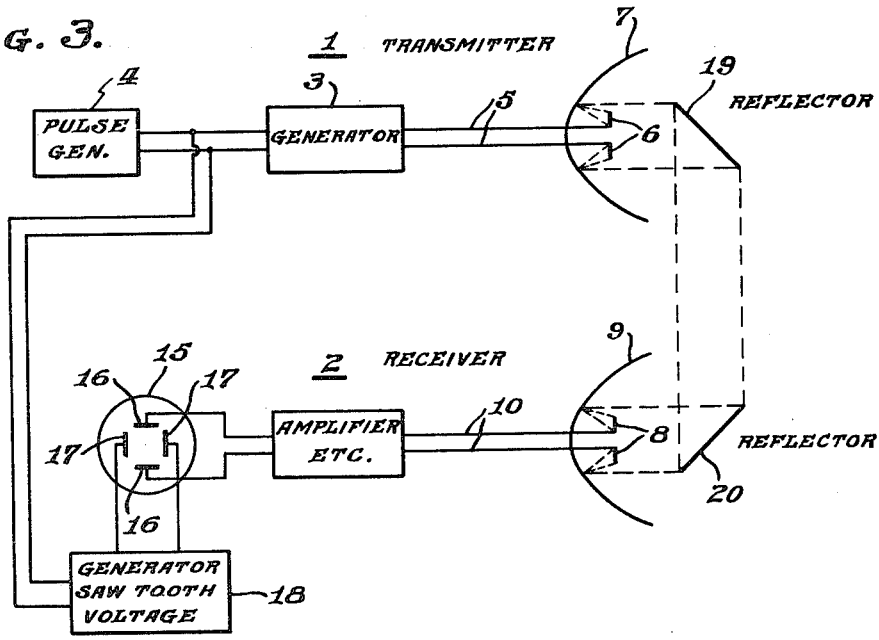
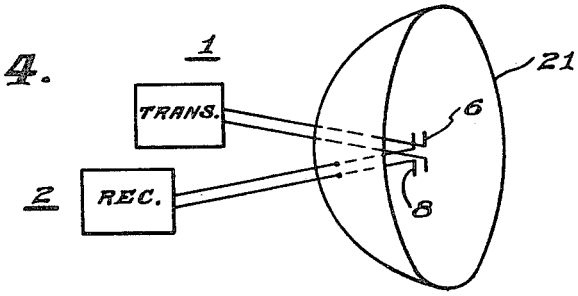
Inventor
Gerrit de Vries
Attorney Inventor
Gerrit de Vries
By
[signature]
Attorney Patented June 29, 1948

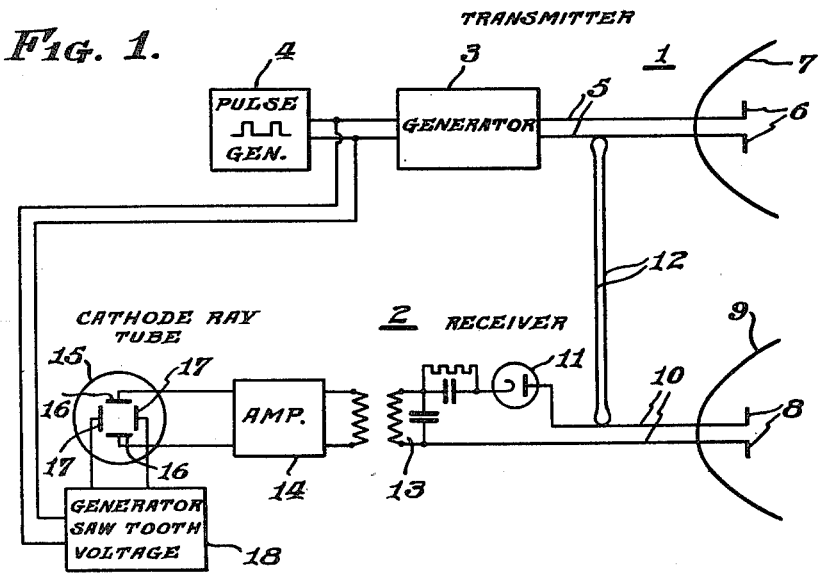
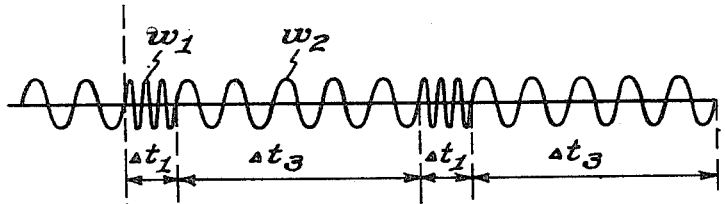
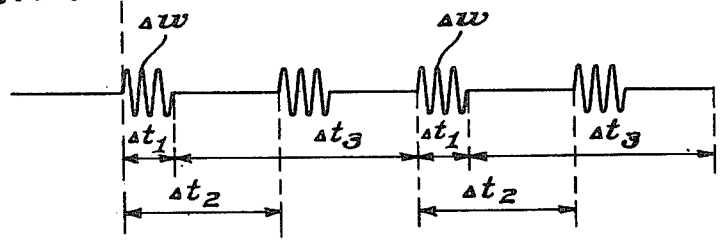

2,444,388

UNITED STATES PATENT OFFICE 2,444,388

DEVICE FOR INDICATING DIRECTION AND DISTANCE

Gerrit de Vries, Eindhoven, Netherlands, assignor, by mesne assignments, to Hartford National Bank and Trust Company, as trustee Application December 29, 1938, Serial No. 248,219
In the Netherlands March 18, 1938

5 Claims. (Cl. 343—13)

This invention has reference to a device for ascertaining the direction and/or distance of stationary or moving bodies, or vehicles for transport by land or water. There has been used for this purpose a transmitter transmitting a pulse-like, amplitude-modulated and directional ultra-high frequency oscillation which can be perceived in a receiver after reflection by the body or vehicle the direction and/or distance of which has to be ascertained.

It is possible to ascertain, by varying the direction of the oscillations transmitted by the transmitter, whether and in what direction a body or vehicle is to be found, for if no body or vehicle is to be found in the transmitted ray-beam, only direct pulses, that is to say non-reflected pulses, are received in the receiver in the same rhythm as that in which they are transmitted. If, however, this rhythm is interrupted in the receiver this is a sign that there is in the ray beam a body or vehicle which brings about a reflected pulse in the receiver. By comparing the transmitted pulses with the received pulses and ascertaining the time that elapses between the transmission and the reception of a pulse it is possible to determine the distance of the body or vehicle.

The prior devices possess a limitation in the fact that the pulses transmitted by the transmitter which, due to the unavoidable coupling, are received directly in the receiver gives rise to overload. According to the invention, this disadvantage is obviated by the transmitter transmitting a carrier wave whose frequency is altered periodically and pulse-like and applying to the receiver an auxiliary oscillation whose frequency is identical at any instant with the oscillations transmitted by the transmitter being combined with the received oscillations.

In order that the invention may be clearly understood and readily carried into effect, embodiments thereof are described more fully with reference to the accompanying drawings in which Figure 1 is a schematic circuit diagram of one embodimnt of the invention;

Figure 2 represents graphically the waves transmitted and received in practicing the invention;

Figure 3 is a schematic diagram of a modification of the invention;

Figure 4 represents a single reflector with transmitting and receiving antennas;

Similar reference numerals are applied to similar elements in the different figures. The advantages of the device according to the invention will become clear from this description.

Figure 5:
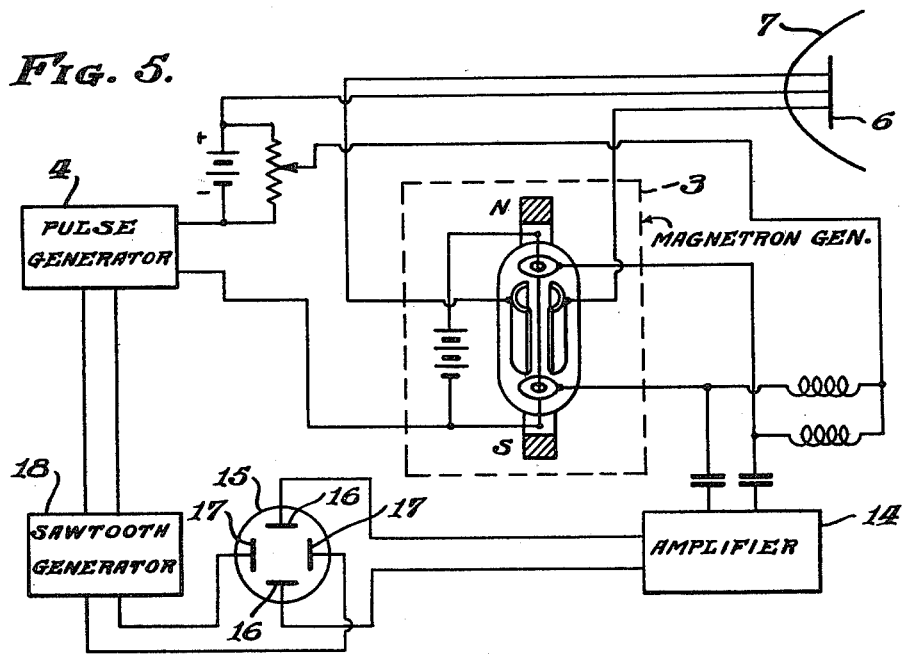
Figure 5 is a schematic circuit diagram of a modification of the invention.

The device shown in Fig. 1 comprises a transmitter 1 and a receiver 2. The transmitter comprises an ultra-short wave generator 3 whose frequency is altered in known manner periodically and pulse-like by frequency modulation by means of pulses generated by a generator 4. The frequency-modulated oscillations are fed, by way of a transmission line 5, to a dipole antenna 6 which is provided with a reflector 7 by means of which a directional beam is transmitted by the transmitter.

The receiver 2 comprises a reception-antenna 8 which is similarly provided with a reflector 9 and is connected to a diode rectifier 11 by way of a transmission line 10. Jointly with an auxiliary oscillation whose frequency corresponds at any time to that of the oscillations transmitted by the transmitter, the received oscillations are fed to the diode rectifier 11. The required auxiliary oscillation is supplied by the transmitter by way of a transmission line 12 which is coupled inductively to the transmission lines 5 and 10.

Since the auxiliary oscillation always has the same frequency as the received oscillations which occur in the receiver due to the unavoidable coupling between the transmitter and the receiver, the output circuit 13 of the diode rectifier 11 will have no voltage with difference-frequency occurring in it so long as there is no reception of waves reflected from a body or vehicle in the transmitted beam of rays. If, however, not only the oscillations transmitted by the transmitter-receiver coupling are received in the receiver, but also oscillations reflected by a body or vehicle, then these reflected oscillations will, jointly with the oscillations fed along the conductor 12, bring about a voltage with difference-frequency in the circuit 13. To elucidate this, it is assumed that at the time $t_0$ (Fig. 2) an oscillation having the frequency $\omega_1$ is transmitted by a transmitter. After a time interval $\Delta t_1$ this frequency is varied by an amount $\Delta\omega$ so that the frequency is $\omega_2 = \omega_1 - \Delta\omega$ which frequency is maintained for the time interval $\Delta t_3$. The oscillation having the frequency $\omega_1$, after reflection by a body or vehicle, will arrive in the receiver after a time interval $\Delta t_2$. If $\Delta t_2 > \Delta t_1$, the frequency of the auxiliary oscillation which is fed to the receiver along the conductor 12 will be $\omega_2$. During the time interval $\Delta t$ in which the reflected oscillations with frequency $\omega_1$ and the applied oscillations $\omega_2$ are received, the circuit 13 has oscillations occurring in it which are possessed of the difference-frequency $\Delta\omega = \omega_1 - \omega_2$.

After a lapse of a time interval $\Delta t_1 + \Delta t_2$ after $t_0$ the reflected oscillation $\omega_2$ will arrive in the receiver and will exist over the time interval $\Delta t_3 - \Delta t_2$. This oscillation combines, with the auxiliary oscillation which is supplied along the conductor 12 and which is then $\omega_2$, to form a zero beat frequency current. Subsequently, during the time interval $\Delta t_1$ in which an auxiliary oscillation with frequency $\omega_1$ is fed to the receiver by the conductor 12 and in which the reflected oscillation $\omega_2$ is received, the oscillatory circuit 13 has again a voltage with difference-frequency $\Delta\omega$ generated in it. Thus, during the time interval $\Delta t_1 + \Delta t_3$ a voltage having a difference-frequency $\Delta\omega$ is set up twice across the circuit 13, said voltage being therefore an indication that there is a body or vehicle in the transmitted ray-beam. The time which elapses between the occurrence of the initial and reflected voltage pulses in the receiver is governed by $\Delta t_2$ and consequently by the distance of the body or vehicle relatively to the transmitter and associated receiver.

The oscillations with difference-frequency occurring in the said circuit 13 can be fed to an indicator 15, if desired by way of an amplifier 14. The indicator is preferably constituted by a cathode ray tube 15 whose deflection plates 16 and 17 alone are shown. The plates 16 have supplied to them the output voltage of the amplifier 14, the plates 17, a saw-tooth voltage generated by a generator 18 which is synchronised by the pulses generated by the pulse generator 4 of the transmitter and whose duration corresponds to $\Delta t_1$, the interval of time between two successive pulses being $\Delta t_3$.

In the absence of a voltage across the circuit 13 the cathode ray beam traces over the fluorescent screen of the cathode-ray tube, a luminous line whose length depends on the time interval $\Delta t_1 + \Delta t_3$. If reflected oscillations are received, then a voltage occurs twice across the circuit 13 over the time interval $\Delta t_1 + \Delta t_3$. These two voltages are noted as pulses with difference-frequency which is visible on the fluorescent screen. The disposition of the second pulse relatively to the first pulse, which is at the starting point of the luminous line, is a measure of the distance at which the body or vehicle which gave rise to the said pulses is spaced from the transmitter and associated receiver.

An important advantage of the device according to the invention resides in that the slow frequency-variations of the generated oscillations, which variations are often unavoidable in the case of ultra-short wave generators, do not exercise any disturbing influence since the difference-frequency $\Delta\omega$ is comparatively not so dependent on the said variations. If desired, the receiver may include an auxiliary generator, the generated auxiliary oscillations of which are combined with the signal oscillations in the antenna 8 so that they jointly supply the difference-frequency and the frequency of which is controlled by the oscillations generated in the transmitter.

In the form of construction shown in Fig. 1 the auxiliary oscillation required in the receiver is fed to the receiver by way of a conductor 12. Fig. 3 shows a form of construction in which a radiation coupling by means of reflectors 19 and 20 is used in order to supply part of the energy radiated by the transmitter for feeding the auxiliary oscillation to the receiver 2. If desired, the transmitting and receiving antennae 6 and 8 may be arranged in a common reflector 21, as is shown in Fig. 4.

The generator 3 (Fig. 5) is preferably constituted by a magnetron valve whose frequency is modulated in known manner by the anode voltage of the valve by causing the pulses generated by the generator 4 to vary. This voltage variation may be accomplished by applying a steady biasing voltage between the anodes and cathode of the magnetron and in series therewith the output voltage of the pulse generator 4. Thus the steady bias voltage is periodically augmented by the pulse voltage. The connections are arranged by joining the positive terminal of the bias voltage source to the common point of the antenna 6 and, through the antenna transmission line, to the anodes. The cathode is connected through the pulse generator to the bias voltage source. This magnetron valve may also be provided with end plates or electrodes, arranged at the ends of the cylindrical surface formed by the anodes. The end plates may be connected to a potentiometer across the bias voltage source through choke coils, which, together with series capacitors between the end plates and amplifier 14, keep the high frequency and biasing voltages separated. In this case the magnetron valve may also serve as a rectifier (mixing valve), for the receiver 2, the received oscillations being fed to the magnetron valve by way of the transmitting antenna which is connected directly to the magnetron anode and indirectly through the anodes to the end plates. The end plates respond to the received signals in the well known manner of a magnetron employing end plates for receiving. In this case, the difference-frequency may be derived from the end plates of the magnetron valve, applied to the amplifier 14 and after amplification, be fed to an indicating instrument, such as the cathode ray tube 15.

Figure 6:
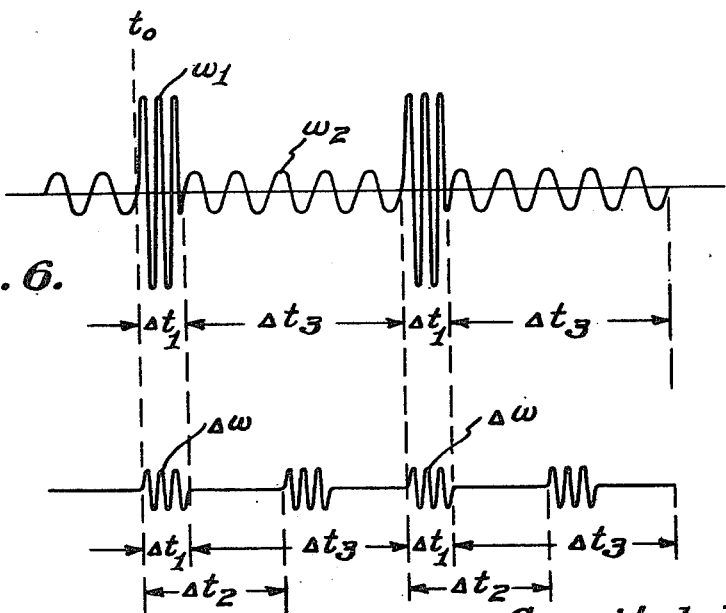
Figure 6 represents graphically frequency and amplitude modulated waves transmitted and received in accordance with the invention.

It is also possible to employ in the transmitter amplitude-modulation in addition to the frequency-modulation described, in such manner that the amplitude of the transmitted oscillations with frequency $\omega_1$ exceeds the amplitude of the oscillations with frequency $\omega_2$. This may be done by adjusting the generators 3 and 4 so that the magnetron produces oscillations of low amplitude upon application of a low bias voltage and of high amplitude upon the further application of a pulse of high amplitude from the pulse generator 4 as shown in Fig. 6. Thus a favorable load condition is created for the transmitter since in this case the transmitter is fully loaded over the time interval $\Delta t_1$ in which the frequency $\omega_1$ is transmitted only and may even be overloaded. During the intervals $\Delta t_3$, which follow the high peak loading intervals $\Delta t_1$, the transmitter power is greatly reduced, thus reducing the amplitude of the oscillations $\omega_2$ and at the same time changing the frequency from the peak power frequency $\omega_1$ to the low power frequency $\omega_2$ as shown in the upper portion of Fig. 6. The magnetron includes the usual means NS for establishing a magnetic field.

I claim as my invention:

1. An object detector including, in combination, a magnetron oscillator having cathode and anode electrodes, means for applying to said anode electrode a positive potential of a predetermined amplitude during successive discrete periods and of another predetermined amplitude during periods of intermediate said discrete periods; said values being selected so as to produce oscillations varying in frequency and amplitude, means for radiating said oscillations, means for receiving reflections of said radiated oscillations, means for applying said oscillations directly to said means for receiving, means for combining in said receiving means currents corresponding to said reflected oscillations and currents corresponding to said directly applied oscillations, and means for indicating said combined currents.

2. An object detector including, in combination, a magnetron oscillator having a cathode electrode, anode electrodes and an auxiliary electrode, means for applying to said anode electrodes a positive potential of a predetermined amplitude during successive discrete periods and of another predetermined amplitude during periods intermediate said discrete periods; said values being selected so as to produce oscillations varying in frequency and amplitude, means for radiating said oscillations, means for receiving reflections of said radiated oscillations, means for applying said oscillations directly to said means for receiving, means comprising said auxiliary electrode for combining in said receiving means currents corresponding to said reflected oscillations and currents corresponding to said directly applied oscillations, and means for indicating said combined currents.

3. An object detector including, in combination, a magnetron oscillator having cathode and anode electrodes, means for applying to said anode electrode a positive potential of a predetermined amplitude during successive discrete periods and of another predetermined amplitude during periods intermediate said discrete periods; said values being selected so as to produce oscillations varying in frequency and amplitude, antenna means for radiating said oscillations and for receiving reflections of said radiated oscillations, a reflector for said antenna means, means for applying said oscillations directly to said means for receiving, means for combining in said receiving means currents corresponding to said reflected oscillations and currents corresponding to said directly applied oscillations, and means for indicating said combined currents.

4. An object detector including, in combination, a magnetron oscillator having cathode and anode electrodes, means for applying to said anode electrode a positive potential of a predetermined amplitude during successive discrete periods and of another predetermined amplitude during periods intermediate said discrete periods; said values being selected so as to produce oscillations varying in frequency and amplitude, means for radiating said oscillations, means for receiving reflections of said radiated oscillations, means for applying said oscillations directly to said means for receiving, means for combining in said receiving means currents corresponding to said reflected oscillations and currents corresponding to said directly applied oscillations, a cathode ray tube connected to said receiving means for indicating said combined currents, and means for deflecting the electron beam of the cathode ray tube in synchronism with the variations of said oscillations.

5. An object detector including, in combination, a magnetron oscillator having a cathode, anode electrodes, and two auxiliary electrodes, means for applying to said anode electrodes a positive potential of a predetermined amplitude during successive discrete periods and of another predetermined amplitude during periods intermediate said discrete periods; said values being selected so as to produce oscillations varying in frequency and amplitude, antenna means for radiating said oscillations and for receiving reflections of said radiated oscillations, a reflector for said antenna means, means for applying said oscillations directly to said means for receiving, means comprising said auxiliary electrodes for combining in said receiving means currents corresponding to said reflected oscillations and currents corresponding to said directly applied oscillations, a cathode ray tube connected to said receiving means for indicating said combined currents, and means for deflecting the electron beam of the cathode ray tube in synchronism with the variations of said oscillations.

GERRIT DE VRIES.

REFERENCES CITED

The following references are of record in the file of this patent:

UNITED STATES PATENTS

| Number | Name | Date |
| --- | --- | --- |
| 1,924,156 | Hart | Aug. 29, 1933 |
| 1,924,174 | Wolf | Aug. 29, 1933 |
| 1,982,271 | Turner | Nov. 27, 1934 |
| 1,988,020 | Rieber | Jan. 15, 1935 |
| 2,011,392 | Bentley | Aug. 13, 1935 |
| 2,045,072 | Espenschied | June 23, 1936 |
| 2,085,798 | Gerhard | July 6, 1937 |
| 2,099,300 | Fritz | Nov. 16, 1937 |
| 2,143,035 | Smith | Jan. 10, 1939 |

FOREIGN PATENTS

| Number | Country | Date |
| --- | --- | --- |
| 809,012 | France | Nov. 24, 1936 |

OTHER REFERENCES

"A Terrain Clearance Indicator," by L. Espenschied et al., article in Bell Telephone System Technical Publication, "Radio B-1124."